(12) United States Patent
Aleksiev et al.

(10) Patent No.: US 11,171,997 B2
(45) Date of Patent: Nov. 9, 2021

(54) HANDLING OF AN IMS CONVERSATIONAL SERVICE OF A USER EQUIPMENT

(71) Applicant: Deutsche Telekom AG, Bonn (DE)

(72) Inventors: Vasil Aleksiev, Vienna (AT); Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 305 days.

(21) Appl. No.: 16/300,967

(22) PCT Filed: May 3, 2017

(86) PCT No.: PCT/EP2017/060519
§ 371 (c)(1),
(2) Date: Nov. 13, 2018

(87) PCT Pub. No.: WO2017/194366
PCT Pub. Date: Nov. 16, 2017

(65) Prior Publication Data
US 2020/0322392 A1    Oct. 8, 2020

(30) Foreign Application Priority Data
May 13, 2016    (EP) .................................... 16169633

(51) Int. Cl.
*H04L 29/06*    (2006.01)
(52) U.S. Cl.
CPC ...... *H04L 65/1016* (2013.01); *H04L 65/1006* (2013.01); *H04L 65/1069* (2013.01); *H04L 65/1073* (2013.01); *H04L 69/28* (2013.01)
(58) Field of Classification Search
CPC ............ H04L 65/1006; H04L 65/1016; H04L 65/1069; H04L 65/1073; H04L 69/28
See application file for complete search history.

(56) References Cited

U.S. PATENT DOCUMENTS

| 9,986,525 B1 * | 5/2018 | Chiang ................. H04W 60/02 |
| 2005/0265382 A1 | 12/2005 | Hartikainen |

(Continued)

FOREIGN PATENT DOCUMENTS

| CN | 1993931 A | 7/2007 |
| CN | 101401376 A | 4/2009 |

(Continued)

OTHER PUBLICATIONS

"3rd Generation Partnership Project; Technical Specification Group Core Network and Terminals, IP multimedia call control protocol based on Session Initiation Protocol (SIP) and Session Description Protocol (SDP), Stage 3 (Release 13)", 3GPP Standard; 3GPP TS 24.229, vol. CT WG1, No. V13.5.1, Mar. 22, 2016 (2016-03-022), pp. 1-920, XP051088328.

*Primary Examiner* — Minh Trang T Nguyen
(74) *Attorney, Agent, or Firm* — Leydig, Voit & Mayer, Ltd.

(57) ABSTRACT

A user equipment is connected to a telecommunications network comprising or associated to an IMS network. The user equipment comprises a memory for storing request timer information related to a request timeout time interval. A method for handling an Internet Multimedia Subsystem (IMS) conversational service of the user equipment includes: storing, by the user equipment, the request timer information in the memory of the user equipment; and attempting, by the user equipment, to register to the IMS network and/or to initiate the IMS conversational service while the request timeout time interval has not expired.

11 Claims, 1 Drawing Sheet

(56) References Cited

U.S. PATENT DOCUMENTS

| | | |
|---|---|---|
| 2006/0034336 A1 | 2/2006 | Huh et al. |
| 2007/0238468 A1* | 10/2007 | Buckley .................. H04L 67/24 |
| | | 455/445 |
| 2007/0255716 A1* | 11/2007 | Sabev .................. G06F 9/4825 |
| 2012/0179959 A1* | 7/2012 | Lindgren ................ G06F 16/83 |
| | | 715/234 |

FOREIGN PATENT DOCUMENTS

| | | |
|---|---|---|
| CN | 103327023 A | 9/2013 |
| CN | 105553989 A | 5/2016 |
| EP | 1909455 A1 | 4/2008 |
| WO | WO 2006014090 A1 | 2/2006 |
| WO | WO 2007079578 A1 | 7/2007 |

\* cited by examiner

HANDLING OF AN IMS CONVERSATIONAL SERVICE OF A USER EQUIPMENT

CROSS-REFERENCE TO RELATED APPLICATIONS

This application is a U.S. National Phase application under 35 U.S.C. § 371 of International Application No. PCT/EP2017/060519, filed on May 3, 2017, and claims benefit to European Patent Application No. EP 16169633.1, filed on May 13, 2016. The International Application was published in English on Nov. 16, 2017 as WO 2017/194366 A1 under PCT Article 21(2).

FIELD

The present invention relates a method for an improved handling of an IMS (Internet Multimedia Subsystem) conversational service of a user equipment being connected to a telecommunications network comprising or being associated to an IMS network, wherein the user equipment applies request timer information via attempting to initiate the IMS conversational service while the request timeout time interval has not expired.

Furthermore, the present invention relates to a system for improved handling of an IMS conversational service of a user equipment being connected to a telecommunications network, the system comprising the telecommunications network and the user equipment, wherein the user equipment applies request timer information via attempting to initiate the IMS conversational service while a request timeout time interval, relating to the request timer information, has not expired.

Additionally, the present invention relates to a telecommunications network and to a user equipment, both being part of an exemplary embodiment of the inventive system, and to a program and a computer program product causing to perform an exemplary embodiment of the inventive method.

BACKGROUND

In known implementations of telecommunications networks, e.g., in mobile communication networks, IMS services involving the use of SIP (Session Initiation Protocol) functionalities typically apply SIP related timers such as specified in 3GPP TS 24.229 (Re1.13 version 13.5.1) clause 7.7, which are used for SIP session and SIP transaction timeout control. This typically means, e.g. for the so-called B timer, that this timer (i.e. the time interval related to that timer) is 64 times another timer (called T1) which is defined to correspond to 2 seconds (i.e. the time interval corresponding to the T1 timer is set to be 2 seconds for the user equipment), which means effectively, that the so-called B timer (i.e. the related time interval) corresponds to 128 seconds. As in conventional implementations this B timer is typically used for SIP session and SIP transaction timeout control, this results in a session timeout of more than 2 minutes which, for conversational services, does not typically correspond to an acceptable user experience.

SUMMARY

In an exemplary embodiment, the present invention provides a method for handling an Internet Multimedia Subsystem (IMS) conversational service of a user equipment connected to a telecommunications network comprising or associated to an IMS network. The user equipment comprises a memory for storing request timer information related to a request timeout time interval. The method includes: storing, by the user equipment, the request timer information in the memory of the user equipment; and attempting, by the user equipment, to register to the IMS network and/or to initiate the IMS conversational service while the request timeout time interval has not expired.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
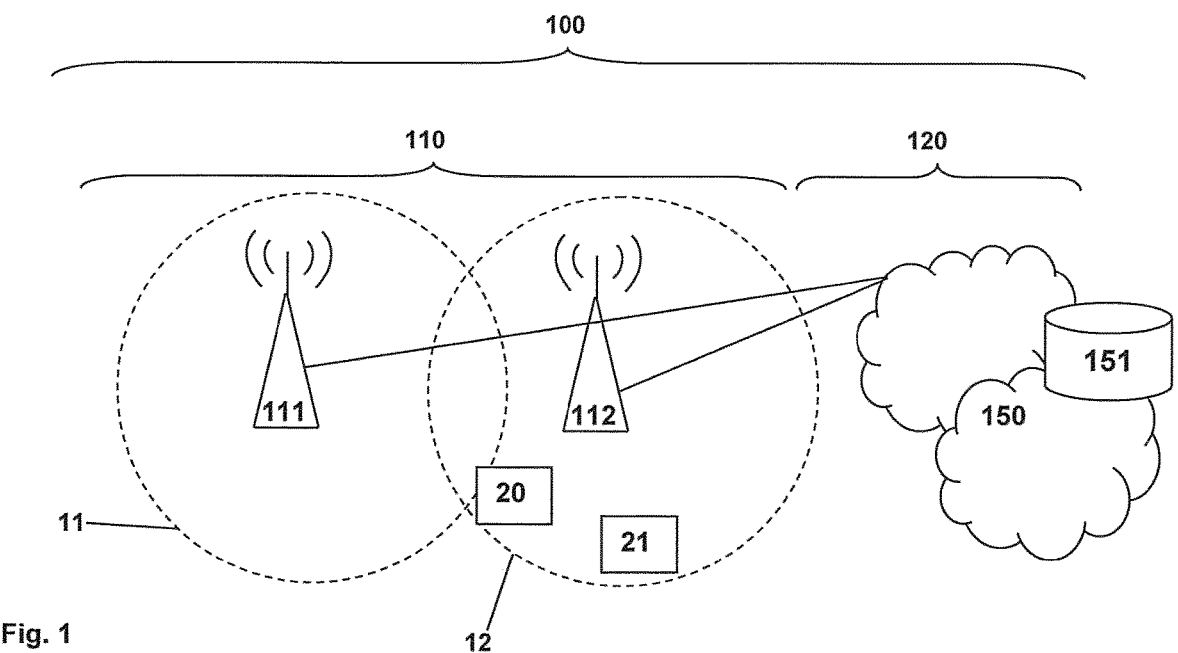
FIG. 1 schematically illustrates a mobile communication network comprising or being associated to an IMS network in accordance with an exemplary embodiment of the invention.

As every telecommunications network is different (due to different network architecture, different network nodes and a different geographical redundancy), the request timeout time intervals to be applied should be adapted to the specific situation considered.

Exemplary embodiments of the present invention provide an effective and simple solution to apply session timeout timers that are as much as possible adapted to the telecommunications network (or the plurality of telecommunications networks) used and/or adapted to the situation of the user of that telecommunications network, in order to enhance the user experience, enhance the ease of use for providing communication services to the user, and to provide for faster establishment of communication links or communication sessions, as well as avoid unnecessary network load.

In an exemplary embodiment, the present invention provides a method for improved handling of an IMS (Internet Multimedia Subsystem) conversational service of a user equipment being connected to a telecommunications network comprising or being associated to an IMS network, wherein the user equipment comprises a memory for storing request timer information being related to a request timeout time interval, wherein the user equipment applies the request timer information via attempting to register to the IMS network and/or to initiate the IMS conversational service while the request timeout time interval has not expired, wherein the method comprises the following steps:

in a first step, the request timer information is stored in the memory of the user equipment, and in a second step, subsequent to the first step, the request timer information is applied by the user equipment while the user equipment attempts to register to the IMS network and/or to initiate the IMS conversational service.

According to the present invention, the request timer information is stored in the memory of the user equipment under the control of the network operator, i.e. typically for devices (or user equipments) distributed under the control of the operator of the telecommunications network. It is thereby advantageously possible according to the present invention to help to improve customer satisfaction and user experience of a user of the telecommunications network via having these timers (i.e. the request timeout time interval corresponding to the request timer information) configurable by the network operator for each device or user equipment used in the telecommunications network of that operator. In case that a device (or user equipment) is not distributed under the control of the operator of the telecommunications network, it cannot be assured that the request timeout time interval (that is adapted to the telecommunications network) will be applied by such a user equipment; hence, it is preferred according to the present invention that the method comprises a third step, prior to the first step, wherein during the third step, the user equipment attaches to the telecommunications network, and the request timer information is transmitted from the telecommunications network to the user equipment.

In a further exemplary embodiment, the present invention provides a method for improved handling of an IMS (Internet Multimedia Subsystem) conversational service of a user equipment being connected to a telecommunications network comprising or being associated to an IMS network, wherein the user equipment comprises a memory for storing request timer information being related to a request timeout time interval, wherein the user equipment applies the request timer information via attempting to register to the IMS network and/or to initiate the IMS conversational service while the request timeout time interval has not expired, wherein the method comprises the following steps:

- in a first processing step, the user equipment attaches (e.g., initially attaches) to the telecommunications network, and the request timer information is transmitted from the telecommunications network to the user equipment,
- in a second processing step, subsequent to the first processing step, the request timer information is stored in the memory of the user equipment, and
- in a third processing step, subsequent to the second processing step, the request timer information is applied by the user equipment while the user equipment attempts to register to the IMS network and/or to initiate the IMS conversational service.

Via transmitting (during the third step (or first processing step) and after the user equipment (e.g., initially) attaches to the telecommunications network) the request timer information from the telecommunications network to the user equipment, it is possible to store the adapted request timer information (i.e. corresponding to the request timeout time interval that is adapted to the configuration and other parameters of the telecommunications network) in the memory of the user equipment, i.e. likewise under the control of the network operator of the telecommunications network. Thereby, it is likewise advantageously possible according to the present invention to help to improve customer satisfaction and user experience of a user of the telecommunications network via having the timer or timers applied for session timeout (i.e. the request timeout time interval corresponding to the request timer information) configurable by (or under the control of) the network operator for each device or user equipment used in the telecommunications network. As every telecommunications network is different, when configuring the telecommunications network, different timers (i.e. time intervals) to be applied by the different network nodes as well as by the user equipments involved are defined in order to deal with time delays related to the network nodes of the telecommunications network and/or related to the distances between the network nodes. Hence, providing the possibility according to the present invention, to define or configure the request timeout timers or request timeout time intervals (via either initially (i.e. prior to the first contact of that user equipment with the telecommunications network) storing the respective request timer information in the memory of the user equipment, or via being able to transmit the corresponding request timer information to the user equipment; typically after (an initial) attachment of the user equipment to the telecommunications network), it is advantageously possible to give the possibility (to the network operator of the telecommunications network) to alter the behavior of the user equipments according to the specific situation of the telecommunications network involved. This allows for adapting the behavior, i.e. the responses, of (all) the user equipments within the telecommunications network more appropriately in view of the network architecture specifics (e.g., regarding data transport and transport redundancy) of the telecommunications network considered; e.g. some telecommunications networks could need a longer time for a response of the SIP request (i.e. the SIP registration request or the SIP invite request of the user equipment)—hence the corresponding request timeout time interval to be applied in that telecommunications network should be set to a longer time interval, thereby only slightly reducing user experience but avoiding excessively high rates of aborted or unsuccessful SIP requests —, and other networks could support shorter times (hence providing the possibility to set the corresponding request timeout time interval to be applied in that (different) telecommunications network to a shorter time interval, thereby improving user experience).

According to an advantageous embodiment of the present invention, a mechanism of the operator of the telecommunications network for remote configuration of the user equipment, e.g., an OTA (Over The Air) procedure, is used to transmit the request timer information (after—e.g., initial—attachment of the user equipment to the telecommunications network).

Via making theses parameters (e.g., the request timeout time interval to be applied by the user equipment) configurable via the mechanism of the operator of the telecommunications network for remote configuration of the user equipment, e.g., an OTA interface, it is possible to improve customer experience which also helps the operator of the telecommunications network to have the respective user equipments apply the minimum times (as possible) according to the specific network architecture as well as transport equipment (within the telecommunications network) of the respective telecommunications network. Furthermore, it is advantageously possible according to a further embodiment of the present invention that a specific data structure is used for transmitting the request timer information, i.e. for timer values, such as, e.g. Managed Object, according to 3GPP standards.

Furthermore according to an advantageous embodiment of the present invention, the request timer information relates to a request timeout time interval of longer than or equal to 5 seconds and of shorter than or equal to 15 seconds, i.e. corresponding to a time interval between 5 seconds and 15 seconds. Having said this, it is likewise advantageous to apply different time intervals of, say, between 3 and 20 seconds (i.e. of longer than or equal to 3 seconds and of shorter than or equal to 20 seconds) or between 3 and 25 seconds (i.e. of longer than or equal to 3 seconds and of shorter than or equal to 25 seconds).

It is thereby advantageously possible according to the present invention to help to improve customer satisfaction and user experience of a user of the telecommunications network.

According to an embodiment of the present invention, it is advantageously possible that—during the second step (third processing step)—the request timeout time interval is started upon the user equipment transmitting or attempting to transmit—in view of initiating the IMS conversational service—a SIP invite message to a network node of the IMS network of the telecommunications network.

Via starting the request timeout time interval after transmitting (or attempting to transmit) the SIP invite message to a network node of the telecommunications network (e.g., a network node of the IMS network of the telecommunications network), it is advantageously possible to apply the request timeout time interval when a conversational IMS service is actually required or initiated by (the user of) the user equipment (irrespective of whether the SIP registration of the user equipment did occur immediately previous to initiating the conversational IMS service or a longer time ago).

According to a further embodiment of the present invention, it is also advantageously possible that the IMS conversational service corresponds to a voice call service or to a video call service or to a push-to-talk service or to an emergency call service, and/or wherein the request timer information relates to a multimedia telephony application (MMTEL application) only, of the user equipment.

According to the present invention it is furthermore preferred that, during a fourth step, e.g., subsequent to the third step, the user equipment, or
a further user equipment—the further user equipment being different from the user equipment and the further user equipment being attached to the telecommunications network—, receives a further request timer information, the further request timer information being related to a further request timeout time interval, the further request timeout time interval corresponding to a time interval different from the request timeout time interval, wherein preferably the further request timeout time interval is applied for other applications compared to multimedia telephony and/or to a further IMS conversational service.

Via transmitting a further request timeout time interval to either the user equipment (also considered with respect to the request timeout time interval/request timer information) or a further user equipment (the further user equipment being different from the user equipment and the further user equipment being attached to the telecommunications network), it is advantageously possible that different user equipments receive request timer information resulting in different request timeout time intervals and/or that the same user equipment receives the further request timer information, corresponding to the further request timeout time interval, to be applied with respect to other applications (compared to multimedia telephony) and/or to be applied with respect to a further IMS conversational service. Thereby, it is advantageously possible for the user equipment to use SIP timers, provided by the telecommunications network, depending on the IMS (conversational) service requested.

According to a further preferred embodiment of the present invention, the request timer information and/or the further request timer information is transmitted to the user equipment prior to establishing a data transmission tunnel with the telecommunications network in view of initiating the IMS conversational service.

Thereby, it is advantageously possible according to the present invention that the request timer information and/or the further request timer information is transmitted to the user equipment with a relatively low frequency, such as once (after an initial contact between the user equipment and the telecommunications network) or sporadically, e.g. after modifications within the telecommunications network have led to improvements (regarding latency or response times) such that, e.g., a lower value of the request timeout time interval is able to be applied.

Furthermore, the present invention relates to a system for improved handling of an IMS (Internet Multimedia Subsystem) conversational service of a user equipment being connected to a telecommunications network, wherein the system comprises the telecommunications network and the user equipment, wherein the telecommunications network comprises or is associated to an IMS network, wherein the user equipment comprises a memory for storing request timer information being related to a request timeout time interval, wherein the user equipment applies the request timer information via attempting to register to the IMS network and/or to initiate the IMS conversational service while the request timeout time interval has not expired, wherein the system is configured such that:

the request timer information is stored in the memory of the user equipment, and
the request timer information is applied by the user equipment while the user equipment attempts to register to the IMS network and/or to initiate the IMS conversational service.

Furthermore, the present invention relates to a system for improved handling of an IMS (Internet Multimedia Subsystem) conversational service of a user equipment being connected to a telecommunications network, wherein the system comprises the telecommunications network and the user equipment, wherein the telecommunications network comprises or is associated to an IMS network, wherein the user equipment comprises a memory for storing request timer information being related to a request timeout time interval, wherein the user equipment applies the request timer information via attempting to register to the IMS network and/or to initiate the IMS conversational service while the request timeout time interval has not expired, wherein the system is configured such that:

the request timer information is transmitted—after the user equipment has or is (initially) attached to the telecommunications network—from the telecommunications network to the user equipment,
the request timer information is stored in the memory of the user equipment, and
the request timer information is applied by the user equipment while the user equipment attempts to register to the IMS network and/or to initiate the IMS conversational service.

Thereby, it is advantageously possible to provide a system such that customer satisfaction and user experience of a user of the telecommunications network is improved via having timeout timers (i.e. the request timeout time interval corresponding to the request timer information) configurable by the network operator, e.g., for each device or user equipment used in the telecommunications network.

Advantageously, it is, e.g., possible according to the present invention, that the system is furthermore configured such that the user equipment attaches to the telecommunications network, and the request timer information is transmitted from the telecommunications network to the user equipment in order to be stored in the memory of the user equipment.

Furthermore advantageously, the transmission of the request timer information is, e.g., performed using a mechanism of the home operator for remote configuration of the user equipment (e.g. OTA, Over the air procedure).

According to a further embodiment of the present invention, the system is furthermore configured such that
the user equipment, or
a further user equipment—the further user equipment being different from the user equipment and the further user equipment being attached to the telecommunications network—,
receives a further request timer information, the further request timer information being related to a further request timeout time interval, the further request timeout time interval corresponding to a time interval different from the request timeout time interval.

Via transmitting a further request timeout time interval to either the user equipment (also considered with respect to the request timeout time interval/request timer information) or a further user equipment (the further user equipment being different from the user equipment and the further user equipment being attached to the telecommunications network), it is advantageously possible that different user equipments receive request timer information resulting in different request timeout time intervals and/or that the same user equipment receives the further request timer information, corresponding to the further request timeout time interval, to be applied with respect to other applications (compared to multimedia telephony) and/or to be applied with respect to a further IMS conversational service.

Furthermore advantageously, the system is furthermore configured such that the request timeout time interval is started upon the user equipment transmitting or attempting to transmit—in view of initiating the IMS conversational service—a SIP invite message to a network node of the IMS network of the telecommunications network, and, e.g., such that the request timer information and/or the further request timer information is transmitted to the user equipment prior to establishing a data transmission tunnel with the telecommunications network in view of initiating the IMS conversational service.

Additionally, it is advantageously possible according to the present invention that the system furthermore comprises a plurality of user equipments, wherein the request timer information is transmitted from the telecommunications network to each user equipment of the plurality of user equipments, e.g., using a mechanism of the operator of the telecommunications network for remote configuration of the user equipment, e.g., an OTA (Over The Air) procedure.

Thereby, it is advantageously possible according to the present invention that the request timer information is transmitted to a plurality of user equipments, hence providing the possibility—e.g., for the network operator—to assure that all user equipments that are used (or attached to the telecommunications network) apply the same request timeout time intervals.

Furthermore, the present invention relates to a telecommunications network for improved handling of an IMS (Internet Multimedia Subsystem) conversational service of a user equipment, the telecommunications network being part of an exemplary embodiment of the inventive system.

Furthermore, the present invention relates to a user equipment for improved handling of an IMS (Internet Multimedia Subsystem) conversational service to a telecommunications network, the user equipment being part of an exemplary embodiment of the inventive system.

Additionally, the present invention relates to a program comprising a computer readable program code which, when executed on a computer or on a network node of a telecommunications network or on a user equipment or in part on the network node of a telecommunications network and in part on the user equipment, causes the computer or the network node of the telecommunications network or the user equipment to perform an exemplary embodiment of the inventive method.

Still additionally, the present invention relates to a computer program product for improved handling of an IMS (Internet Multimedia Subsystem) conversational service of a user equipment being connected to a telecommunications network comprising or being associated to an IMS network, the computer program product comprising a computer program stored on a storage medium, the computer program comprising program code which, when executed a computer or on a network node of a telecommunications network or on a user equipment or in part on the network node of a telecommunications network and in part on the user equipment, causes the computer or the network node of the telecommunications network or the user equipment to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 as an example of an exemplary embodiment of the inventive telecommunications network is schematically shown. The telecommunications network comprises or is associated to an IMS network 150. In the exemplary embodiment of FIG. 1, the telecommunications network is realized as a cellular mobile communication network, comprising an access network 110 and a core network 120. Furthermore in the exemplary embodiment of FIG. 1, the access network 110 comprises a first radio cell 11 and a second radio cell 12. A first base station entity 111 serves the first radio cell 11, and a second base station entity 112 serves the second radio cell 12. Of course, typically, a mobile communication network comprises a certain number of radio cells, typically far exceeding two radio cells. Instead of realizing the telecommunications network as a mobile communication network 100, it is also possible according to the present invention that the telecommunications network is realized as a fixed line telecommunications network. Also in the latter case, the telecommunications network typically comprises an access network and a core network similar to the core network 120 of the mobile communication network 100 as schematically shown in FIG. 1.

The telecommunications network comprises, e.g., as part of its core network 120, or, at least, accessible by the core network 120 of the telecommunications network, an IMS network 150. The IMS network 150 typically comprises a plurality of network nodes, one of which is designated by reference sign 151 in FIG. 1.

Furthermore, the telecommunications network typically comprises (or is associated with) a plurality of user equipments, one of which is designated in FIG. 1 by reference sign 20, a further user equipment being designated by reference sign 21 (alternatively, one could speak of the first user equipment 20 and a further or second user equipment 21).

Figure 2:
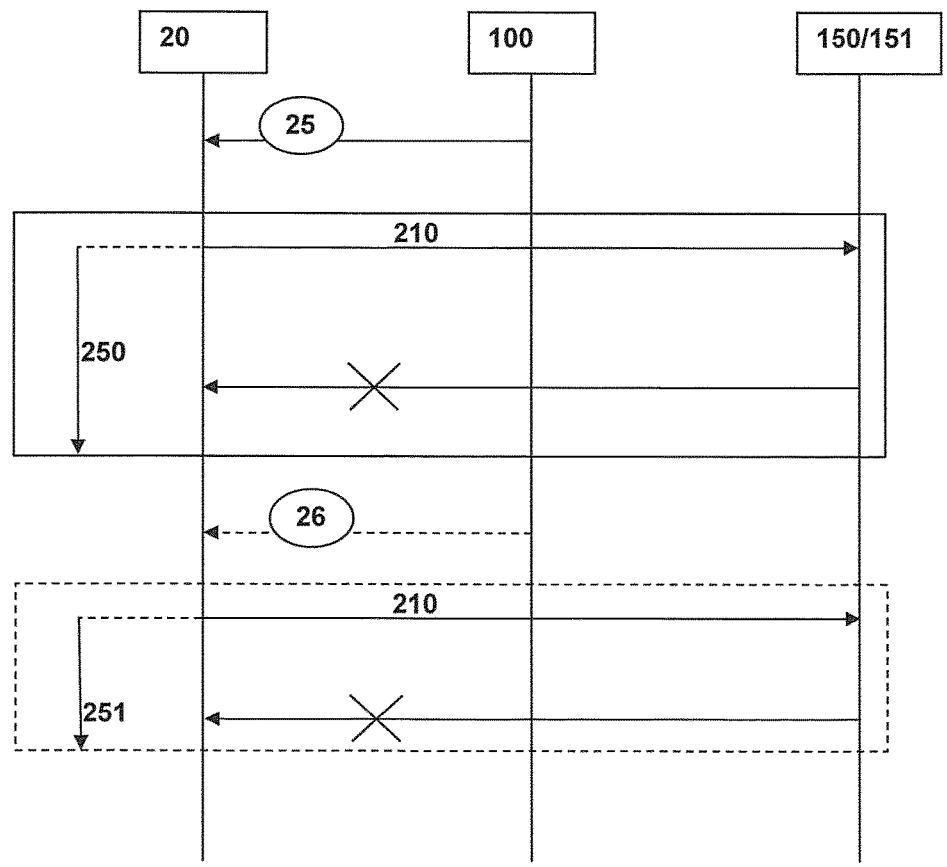
FIG. 2 schematically illustrates a communication diagram in accordance with an exemplary embodiment of the invention.

According to the present invention, an improved method of handling an IMS (Internet Multimedia Subsystem) conversational service is provided. The method assumes that a user equipment 20 is connected to the telecommunications network that comprises (or is associated) to the IMS network 150 (comprising (at least) the (IMS) network node 151). This is schematically shown via the communication diagram of FIG. 2, schematically showing the communication between the user equipment 20, the telecommunications network, and the IMS network 150/network node 151.

According to the present invention, it is assumed that—in a first step—the request timer information 25 is stored in the user equipment 20, typically in a memory of the user equipment 20. In a second step, subsequent to the first step, the request timer information 25 is applied by the user equipment 20 while the user equipment 20 attempts to initiate the IMS conversational service, via sending a SIP invite message 210 to the network node 151 of the IMS network 150. This is represented, in FIG. 2, by a rectangle, having drawn-through lines, comprising the SIP invite message 210 from the user equipment 20 to the network node 151 of the IMS network 150. After sending the SIP invite message 210, the request timeout time interval 250 is started (indicated by a vertical arrow on the left hand side of the rectangle representing the user equipment 20 attempting to initiate the IMS conversational service. FIG. 2 exemplarily shows the situation of the attempt (of the user equipment 20) failing, being indicated by a crossed out return arrow being directed from the IMS network 150/network node 151 towards the user equipment 20. The attempt is aborted when the request timeout time interval 250 expires. According to the present invention, two main embodiments are disclosed: Either, the request timer information 25 is stored (in the memory of the user equipment 20) initially under the control of the operator of the telecommunications network, or the request timer information 25 is stored (in the memory of the user equipment 20) after having been transmitted to the user equipment 20 (by the telecommunications network; cf. the arrow with reference sign 25 in FIG. 2). The first case relates, e.g. to the user equipment 20 being sold to a customer under the control of the operator of the telecommunications network. The latter case relates to all other situations where there is a need to assure that the request timeout time interval 250 to be applied by the user equipment 20 (with respect to initiating an IMS conversational service) corresponds to what is appropriate within the telecommunications network.

E.g., with respect to the embodiment according to which the request timer information 25 is transmitted to the user equipment 20, an exemplary embodiment of the inventive method can be describes as follows: In a first processing step, the user equipment 20 attaches (e.g., initially attaches) to the telecommunications network, and the request timer information 25 is transmitted from the telecommunications network to the user equipment 20.

In a second processing step, subsequent to the first processing step, the request timer information 25 is stored in the user equipment 20, typically in a memory of the user equipment 20.

In a third processing step, subsequent to the second processing step, the request timer information 25 is applied by the user equipment 20 while the user equipment 20 attempts to register to the IMS network 150 and/or to initiate the IMS conversational service (represented by the rectangle, having drawn-through lines)

According to an alternative embodiment of the present invention, it is possible according to the present invention that (either subsequently to transmitting the request timer information 25 or simultaneously to transmitting the request timer information 25) a further request timer information 26 is transmitted to the user equipment 20 (cf. the horizontal dashed arrow in FIG. 2). A further request timeout time interval 251 (e.g., different compared to the request timeout time interval 250) corresponds to the further request timer information 26. Likewise to applying the request timeout time interval 250, the further request timeout time interval 251 is applied, which is represented, in FIG. 2, by a rectangle, having dashed lines, comprising likewise a (further) SIP invite message 210 from the user equipment 20 to the network node 151 of the IMS network 150. After sending the SIP invite message 210, the further request timeout time interval 251 is started (indicated by a vertical arrow on the left hand side of the dashed rectangle representing the user equipment 20 attempting to initiate, e.g., a further IMS conversational service. Again, FIG. 2 exemplarily shows the situation of the attempt (of the user equipment 20) failing, being indicated (also in the dashed rectangle) by a crossed out return arrow being directed from the IMS network 150/network node 151 towards the user equipment 20. The attempt is aborted when the further request timeout time interval 251 expires.

In both cases described above, the error situation (why the attempt of the user equipment 20 to initiate the IMS conversational service via the SIP invite message 210 fails) typically includes that there is no answer (to the SIP invite message 210) received in the user equipment 20, e.g. due to:
  lack of coverage in LTE (Long Term Evolution) domain,
  the P-CSCF (Proxy Call Serving Control Function) to which the UE is registered being down (e.g. due to hardware or power failure), transport layer to P-CSCF is down (router failure),
  the transport layer to the P-CSCF being down (e.g. due to a router failure),
  the physical (transport) layer to the P-CSCF being down (e.g. due to a problem in transmission).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling an Internet Multimedia Subsystem (IMS) conversational service of a user equipment connected to a telecommunications network comprising or associated to an IMS network, wherein the method comprises:

sending, by the telecommunications network to a user equipment, request timer information related to a request timeout time interval;
and
receiving, by the telecommunications network from the user equipment, one or more attempts to register to the IMS network and/or to initiate the IMS conversational service while the request timeout time interval has not expire;
wherein different network nodes of the telecommunications network transmit different request timer information having different request timeout time intervals to different user equipments, wherein respective timeout time intervals corresponding to the different network nodes are based on respective time delays associated with respective network nodes and/or based on respective distances between respective network nodes.

2. The method according to claim 1, wherein the method further comprises, prior to sending the request timer information, the user equipment is attached to the telecommunications network; and
wherein the telecommunications network sends the request timer information to the user equipment via an Over-The-Air (OTA) procedure.

3. The method according to claim 1, wherein the request timeout time interval is started upon the user equipment transmitting or attempting to transmit a Session Initiation Protocol (SIP) invite message to a network node of the IMS network.

4. The method according to claim 1, wherein the IMS conversational service corresponds to a voice call service or to a video call service or to a push-to-talk service or to an emergency call service.

5. A system for handling an Internet Multimedia Subsystem (IMS) conversational service of a user equipment connected to a telecommunications network, wherein the system comprises:
the telecommunications network, wherein the telecommunications network comprises or is associated to an IMS network; and
the user equipment, wherein the user equipment comprises a memory, and wherein the user equipment is configured to:
receive, from the telecommunications network, request timer information related to a request timeout time interval;
store the received request timer information in a memory of the user equipment; and
attempt to register to the IMS network and/or to initiate the IMS conversational service while the request timeout time interval has not expire;
wherein different network nodes of the telecommunications network are configured to transmit different request timer information having different request timeout time intervals to different user equipments, wherein respective timeout time intervals corresponding to the different network nodes are based on respective time delays associated with respective network nodes and/or based on respective distances between respective network nodes.

6. The system according to claim 5, wherein the user equipment is further configured to attach to the telecommunications network; and
wherein telecommunications network is further configured to transmit the request timer information to the user equipment via an Over-The-Air (OTA) procedure.

7. The system according to claim 5, wherein the user equipment is configured to start the request timeout time interval upon the user equipment transmitting or attempting to transmit a Session Initiation Protocol (SIP) invite message to a network node of the IMS network of the telecommunications network, and prior to establishing a data transmission tunnel with the telecommunications network in view of initiating the IMS conversational service.

8. The system according to claim 5, wherein the system further comprises a plurality of user equipments, wherein the telecommunications network is configured to transmit the request timer information to each user equipment of the plurality of user equipments via an Over-The-Air (OTA) procedure.

9. A non-transitory computer-readable medium having processor-executable instructions stored thereon for handling an Internet Multimedia Subsystem (IMS) conversational service of a user equipment connected to a telecommunications network comprising or associated to an IMS network, wherein the processor-executable instructions, when executed, facilitate:
sending, by the telecommunications network to a user equipment, request timer information related to a request timeout time interval;
and
receiving, by the telecommunications network from the user equipment, one or more attempts to register to the IMS network and/or to initiate the IMS conversational service while the request timeout time interval has not expired;
wherein different network nodes of the telecommunications network transmit different request timer information having different request timeout time intervals to different user equipments, wherein respective timeout time intervals corresponding to the different network nodes are based on respective time delays associated with respective network nodes and/or based on respective distances between respective network nodes.

10. The method according to claim 1, wherein the request timer information relates to a multimedia telephony (MMTEL) application of the user equipment.

11. The method according to claim 1, wherein the request timeout time interval is a Session Initiation Protocol (SIP) request timeout time interval corresponding to an SIP registration request or an SIP invite request of the user equipment, wherein the SIP request timeout time interval is adjustable by the telecommunications network.

* * * * *